United States Patent [19]
Fischer

[11] 3,907,417
[45] Sept. 23, 1975

[54] CONTROLLED PROJECTION READER
[75] Inventor: Joerg Fischer, Madison, Ala.
[73] Assignee: Avco Corporation, Huntsville, Ala.
[22] Filed: Feb. 10, 1975
[21] Appl. No.: 548,195

[52] U.S. Cl. .................. 353/46; 353/95; 35/35 B
[51] Int. Cl.² .............. G03B 21/44; G09B 17/04; G03B 1/48
[58] Field of Search ............... 353/95, 96, 46–51, 353/68; 35/35 B

[56] References Cited
UNITED STATES PATENTS

| | | | |
|---|---|---|---|
| 2,758,393 | 8/1956 | Levy | 35/35 B |
| 3,322,035 | 5/1967 | Admon | 35/35 B |
| 3,498,700 | 3/1970 | Macomber | 35/35 B |
| 3,502,406 | 3/1970 | Macomber | 353/74 |

*Primary Examiner*—Richard E. Aegerter
*Assistant Examiner*—A. Jason Mirabito
*Attorney, Agent, or Firm*—Charles M. Hogan; Irwin P. Garfinkle

[57] ABSTRACT

A controlled projection reader is disclosed in which film having indicia thereon is passed by an aperture area. A lamp and lens arrangement projects the indicia on the film onto a screen or the like. A scanning disc is mounted relative to the aperture area so as to be rotatably driven relative to the film and aperture area. Means on the disc permits scanning or line-type reading to occur. A masking disc is mounted for relative movement relative to the scanning disc to permit either scan-type operation or full line projection. The film is looped toward the scanning disc to reduce the distance between the aperture mask, image plane on the film and the scanning disc so as to project a clear border line on the screen. Means for advancing the film in response to rotational movement of the scanning device is provided.

7 Claims, 12 Drawing Figures

CONTROLLED PROJECTION READER

BACKGROUND OF THE INVENTION

This invention relates to projectors and more particularly to a controlled projection reader for projecting material onto a screen.

Projection readers basically comprise an optical system and means to project lines of reading material or the like spaced on a film at various speeds and in various manners. Projectors of this type are known and available in today's technology. Examples of such projectors are disclosed in the U.S. patent issued to Levy, U.S. Pat. No. 2,758,393; Taylor U.S. Pat. No. 2,745,313; Admon U.S. Pat. No. 3,322,035; and Macomber U.S. Pat. No. 3,502,406. The Macomber patent includes a general description of the various methods of reading with the use of mechanical reading machines. These methods are known as scanning and group fixation.

The presently available projectors of the above type perform satisfactorily with 35 millimeter films presently available. However, the tendency is to use smaller film, for example, 8 millimeter film in order to achieve cost savings. In addition, the usage of a smaller film will result in a smaller projector, smaller film cassette and, therefore, an added cost saving and better product. Many of the current projectors do not perform with small film. Those projectors which do utilize the small film do not provide the necessary illusion due to the greater magnification.

Accordingly, it is an object of this invention to provide a controlled projection reader which uses a small film of the 8 millimeter class.

A still further object of this invention is to provide a controlled projection reader which provides the required illusion, is very simple to operate, reliable in operation and mass producible at low cost.

A further object of this invention is to provide a controlled projection reader with which it is possible to create different illusions, such as masking, scanning, or full line projection.

And yet another object of this invention is to provide a controlled projection reader having improved film looping toward the focal plane of the lens so as to present a clear border line on the screen.

SUMMARY

This invention provides a controlled projection reader which comprises a disc assembly rotatably mounted on a motor shaft, the assembly being adjacent the aperture area. The disc assembly is formed with appropriate cut-out portions therein so as to permit a variety of different illusions on the projected image. Means is provided to lock the disc assembly in the different operating conditions. The aperture area includes means for urging the film toward the disc assembly.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of the invention in which.

DESCRIPTION OF ILLUSTRATED EMBODIMENTS

Figure 1:
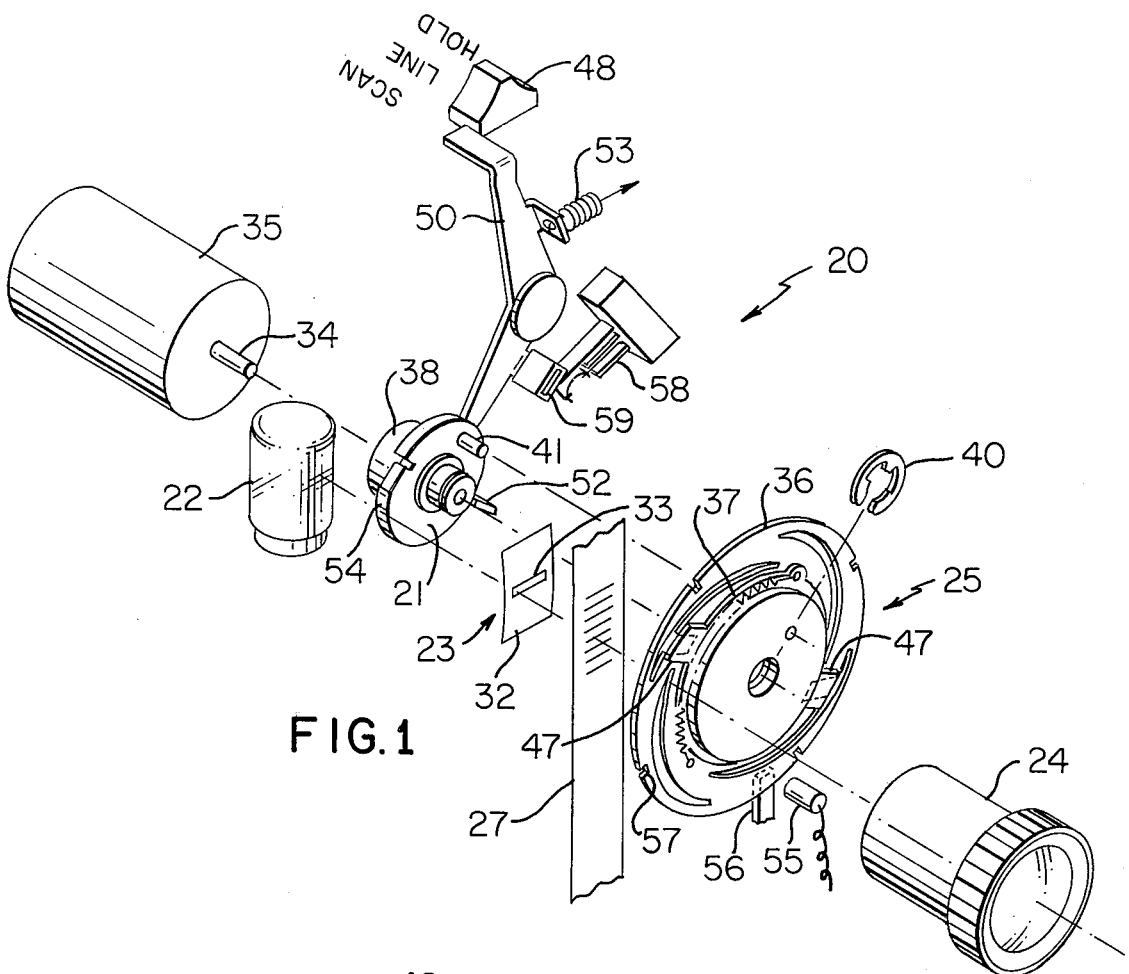
FIG. 1 is an exploded perspective view of the controlled projection reader of this invention.
Figure 2:
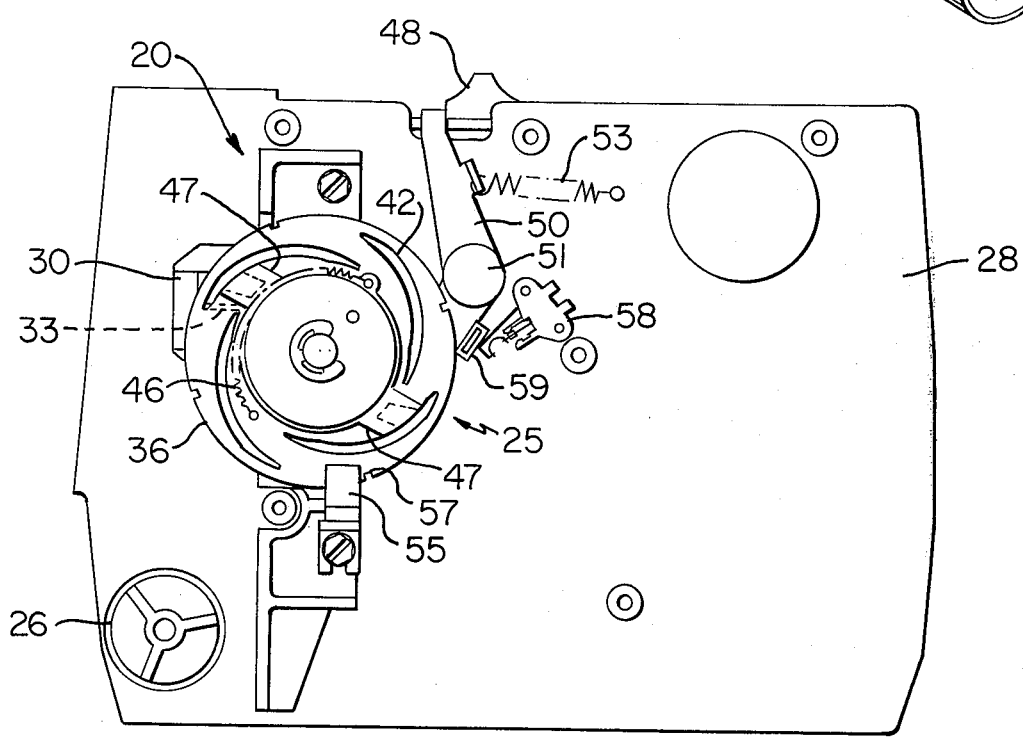
FIG. 2 is a front elevational view of the controlled projection reader of this invention with the front panel removed to show the aperture area and scanning disc mechanism.
Figure 3:
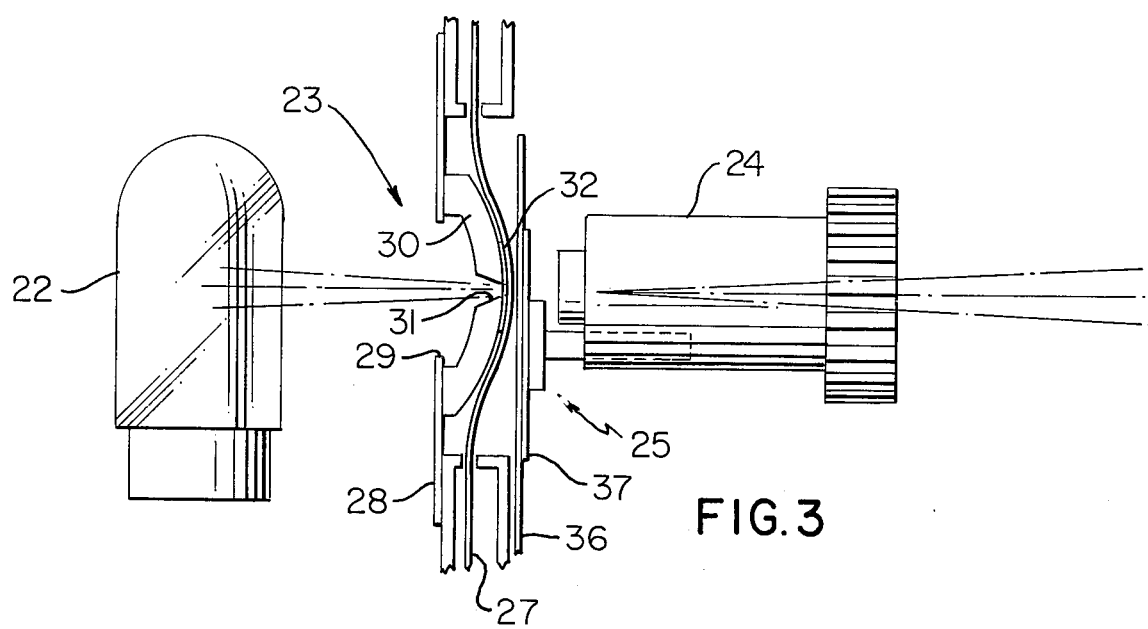
FIG. 3 is a schematic representation of the optical system used in the projection reader of this invention, particularly showing the film-looping apparatus.

Reference is now made to FIGS. 1—3 of the drawings, which illustrate one exemplary embodiment of the improved controlled projection reader of this invention, which is designated generally by the reference numeral 20. This invention is primarily concerned only with the projection system, aperture area and scanning disc and controls therefor. Accordingly, the projector housing, printed circuit board and circuitry are not shown herein. The projection reader comprises basically a lamp 22, aperture area 23, lens 24, scanning disc assembly 25, and a film transport mechanism 26. The film transport mechanism 26 is rotatably driven by suitable motor and gearing means (not shown) of conventional design. The transport mechanism can be operated either manually and/or automatically at variable speeds.

As best seen in FIGS. 1 and 3, the film 27 passes between the aperture area 23 and disc assembly 25. The film 27 is sequentially advanced by the film transport mechanism 26. It is desirable that the scanning disc 36 and aperture mask 32 be as close to the film 27 as possible so as to provide clear border lines on the screen. In order to accomplish this, the film is looped toward the disc assembly 25 as best seen in FIG. 3. A wall 28 is formed with an opening 29 therethrough through which the light from lamp 22 projects. A plate 30 having an opening 31 is mounted on the wall 28. The plate 30 may be mounted so as to provide limited vertical movement such that the aperture may be properly aligned by known means. It is seen that the plate 30 is formed with a curved outer surface to which is mounted an aperture mask 32 which has an aperture 33 formed therein in registry with opening 31. The curved surface of the plate 30 and aperture mask 32 urge the film 27 outwardly in a curved or looped configuration so as to place the focal plane of the lens 24 near the disc assembly 25.

The disc assembly is mounted on shaft 34 of motor 35 so as to be rotatably driven thereby. The motor 35 is mounted to the wall 28 in such manner that the scanning disc 36 is rotatably supported between the film 27 and lens 24.

The disc assembly 25 is comprised of a scanning disc 36 and a masking ring 37 which are mounted on the cam member or shaft 38. A suitable washer or the like 39 holds the scanning disc 36 in contact with a flat surface of the cam member 38. The disc assembly is held together by the use of a suitable clip or the like 40. A pin 41 angularly positions the scanning disc 36 relative to the flange surface 21. The masking ring 37 is not positioned by the pin 41 and is therefore movable relative to the scanning disc 36.

Figure 11:
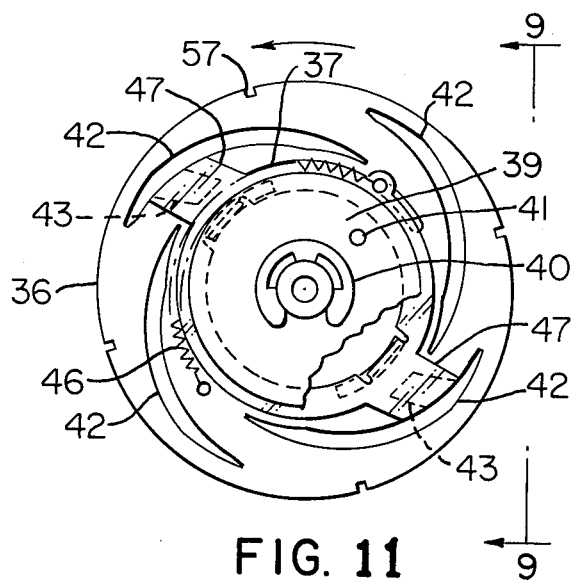
FIG. 11 is a front elevational view of the disc assembly.
Figure 12:
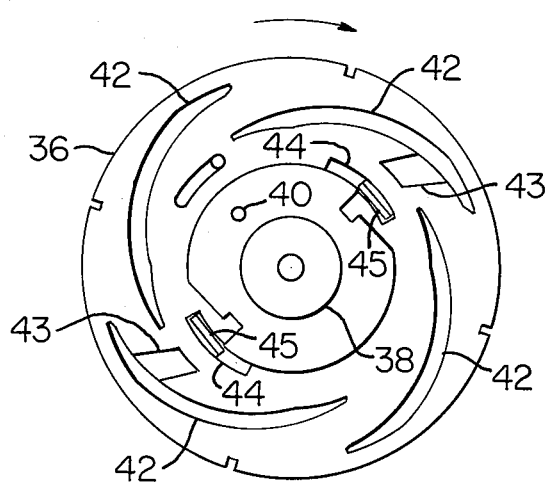
FIG. 12 is a rear elevational view of the disc assembly of FIG. 11, particularly taken along the line 12—12 of FIG. 9.

The scanning disc 36 is formed with a plurality of spiral slots or channels 42 about the periphery thereof. In the preferred embodiment described herein four spiral slots are provided. Two of the slots are also formed with cut-out portions or windows 43. As best seen in FIG. 12, the scanning disc 36 is formed with a pair of diametrically opposed slots 44 through which projecting tongues or flaps 45 of the masking ring 37 project. The projecting tongues 45 permit limited relative angular displacement between the scanning disc 36 and masking ring 37. As seen in FIG. 11, the masking ring 37 is biased in the counterclockwise direction by spring 46 such that the masking ring 37 is normally positioned at a scanning condition wherein ears 47 on the masking ring are superimposed over the windows 43. The biasing means may be any suitable arrangement. In the preferred embodiment one end of the spring 46 is attached to the scanning disc and the opposite end of the spring is attached to the masking ring.

Figure 8:
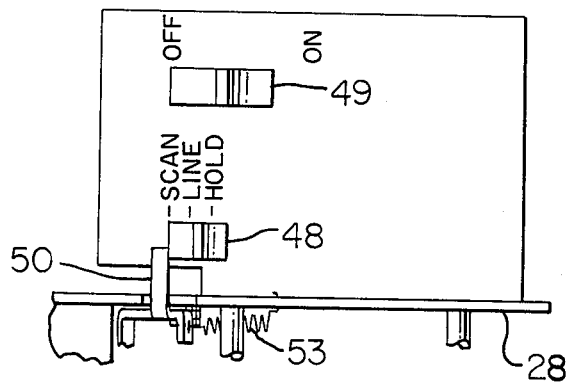
FIG. 8 is a top view of the projection reader of FIG. 2 showing the control positions.
Figure 9:
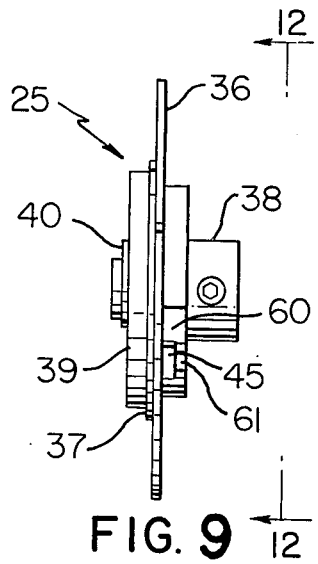
FIG. 9 is a side view of the disc assembly as taken along line 9—9 of FIG. 11.

The projection reader 20 of this invention is capable of operating in three conditions, i.e., line scan operation, full line projection, and full line hold projection. In this description, the three operating conditions are respectively referred to as scan, line, or hold. As seen in FIGS. 1 and 8, the positions of switch 48 determine the operating conditions. An on-off switch 49 controls power to the unit.

Switch 48 mechanically engages a lever 50, as seen in FIGS. 1, 2, 8 and 10. Lever 50 is pivotally secured to the wall 28 by pin 51. Lever 50 is provided with an outwardly projecting lug 52 which cooperatively engages the disc assembly 25 to determine the operating condition of the disc, as will be described hereinbelow. Spring 53 biases the lever 50 in the clockwise direction (FIG. 10) and such clockwise movement is limited by the positioning of the switch 48.

Figure 4:
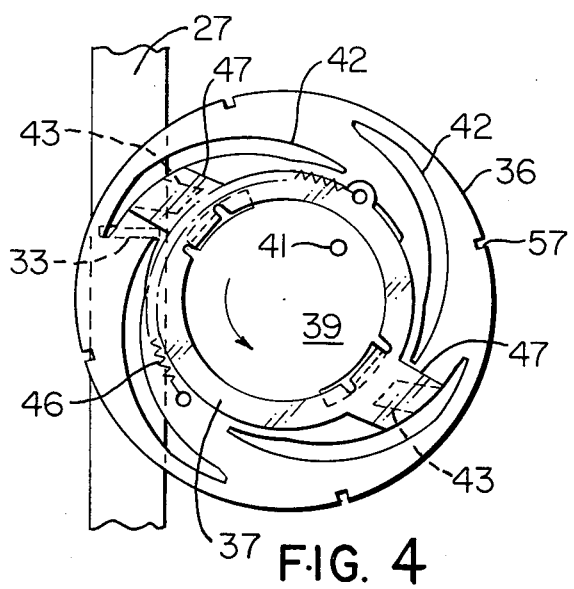
FIG. 4 is a front view of the disc assembly as seen in the scan condition.
Figure 10:
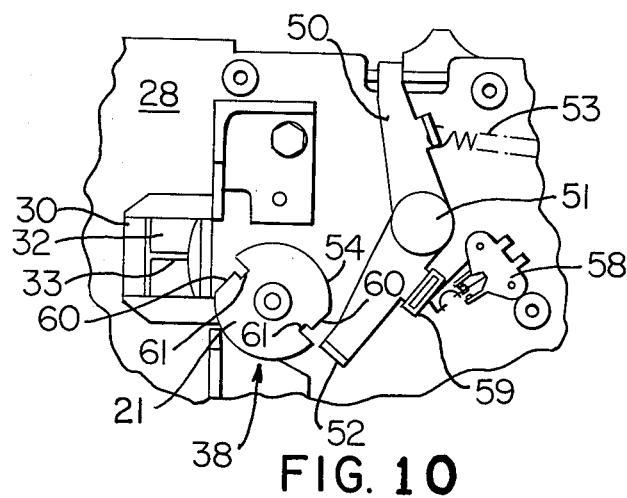
FIG. 10 is a fragmentary view of the projection reader with the scanning disc removed to show the aperture area and control lever.

In the scan operation condition, as illustrated in FIGS. 8 and 10, the lug 52 is held out of engagement with the cam surface 54 and also out of contact with the tongue 45 of ring 37. In this operating condition, as seen in FIGS. 4 and 11, it is noted that the ears 47 are superimposed over the windows 43 in such manner that only the slots 42 will traverse relatively over the aperture 33 as the disc 36 is rotated in the counterclockwise direction, i.e., the direction of the arrows. Thus, as the disc 36 is rotated the respective slot 42 will progressively pass over the aperture area from left to right as viewed in FIG. 4. Hence, that portion of the film which is uncovered by the slot 42 will be projected onto the screen. The speed of the rotation of disc 36 may be controlled by conventional methods such that the portion being illuminated and projected will remain illuminated, dependent on the operator's desires. As each spiral slot 42 completes its traversing of the aperture area, the next spiral slot comes into the position for traversing the aperture 33 once again. The film 27 is sequentially advanced by the film advance mechanism 26. In the preferred embodiment shown herein, photoelectric means is incorporated to sequentially advance the film in proper sequence with the rotation of the disc 36.

In the preferred embodiment described herein, the photo-interruption device is comprised of a photoelectric cell element such as a light emitting diode 55 and receiver 56 (FIG. 1). The light emitting diode and receiver 56 are mounted on the wall 28 such that the peripheral edge of the disc 36 passes therebetween. The disc 36 is formed on the peripheral edge with a plurality of notches 57. Known electrical circuitry is provided between the photo-interruption elements 56 and 55 such that when each slot 57 passes therethrough the film will be advanced. Thus, the film advance is controlled by the timing of the rotational movement of the disc 36. In the preferred embodiment described herein, the position of the slots 53 is such that the film advances between the end of a scan and the beginning of a new scan.

The switch 48 has three positions:

a. Scan, whereat lug 59 closes cam motor switch 58 and lug 52 is free, permitting disc 36 and mask 37 to run;

b. Line, and lug 52 engages a tongue 45, arresting mask 37, and follows surface 61 until it engages a slot 61, arresting disc 36 when 43 and 33 are in registry, and scan motor switch 58 opens, spring 46 then urging ring 37 clockwise (FIG. 11) to open 43;

c. Hold, opening power to the film motor.

Electrical power to the motor 35 is controlled by a lost motion switch 58. Thus, in the scan condition the lug 59 of the lever 50 biases the two-position switch 58 into a closed condition wherein electrical power is supplied to the motor 35. When the leaf switch 48 is moved to the line operating condition the spring 53 urges the lever 50 in the clockwise direction such that the lug 52 is brought into touching contact with the cam surface 54. The cam surface 54 is seen to include two substantially flat surfaces 60 which terminate in slots 61. Thus, continued rotational movement of the disc 36 will cause the lug 52 of lever 50 to follow one of the flat surfaces 60 and ultimately terminate in the slot 61. Due to the biasing force of spring 53 the lever is thus held in engagement with the slot 61 thereby preventing further rotation of the disc assembly 25.

Figure 5:
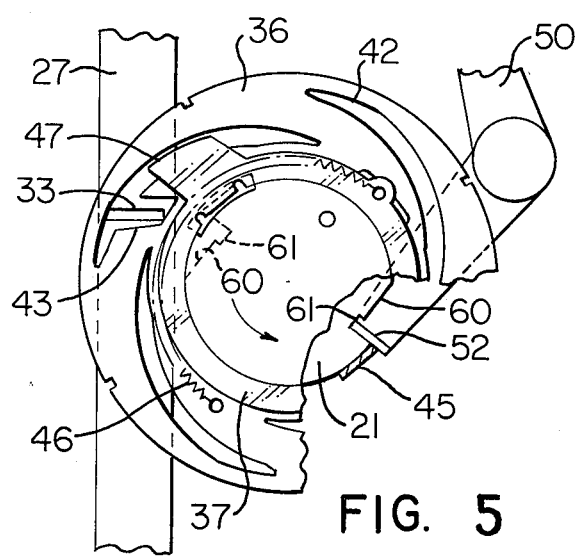
FIG. 5 is a front elevational view of the disc assembly as shown in the line projection condition.

As the lug 52 engages the flat surface 60, the lug will also come into engaging contact with one of the masking ring tongues 45. As seen in FIGS. 5 and 12, engagement of the lug 52 with one of the tongues 45 will prevent further rotational movement of the masking ring 37. Thus, as the disc 36 continues to rotate until such time as the lug 52 enters the slot 61, the windows 43 will be moved out from under the ears 47. When the disc assembly 25 is stopped due to the engagement of the lug 52 in the slot 61 a slot 42 and window 43 will be superimposed over the aperture 33 and the full line on the film will be projected onto the screen.

When the lug 52 is urged into contact with the slot 61, the lost motion feature of the switch 58 permits the switch to go to the open position. When this occurs, power is terminated to the motor 35. In this condition electrical power is continuously supplied to the film advance mechanism such that the film is sequentially advanced wherein full line projection occurs. The electronic timing circuit of the film advance may be manually adjusted through conventional means.

Movement of the switch 48 to the hold condition position as seen in FIG. 8, will terminate electrical power to the film advance mechanism wherein the full line projection will be permanently displayed on the screen. As the switch 48 is again moved to the scan position the lever 50 will be urged in the counterclockwise direction thereby overcoming the biasing force of the spring 53. The lug 52 will be withdrawn from the slot 61 and will become disengaged with the ring tongues 45. When this occurs, the biasing spring 46 will urge the masking ring 37 in the counterclockwise direction (FIG. 11) such that the ears 47 will again be superimposed over the window 43.

Figure 6:
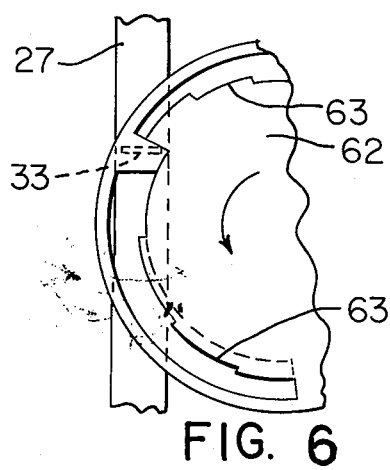
FIGS. 6–7 are fragmentary elevational views of other disc assemblies which can be used to create other illusions.
Figure 7:
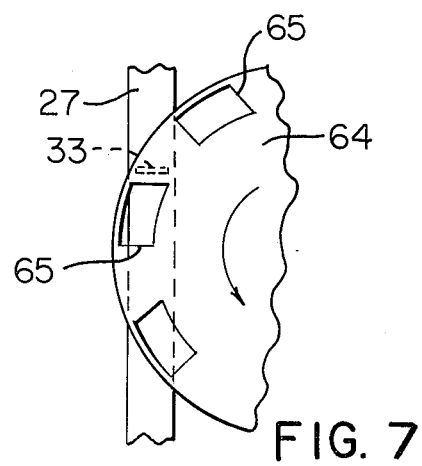

FIGS. 6 and 7 illustrate other exemplary disc assemblies which may be used with the projection reader of this invention. In FIG. 6 the scanning disc 62 is provided with a plurality of stepped cut-outs 63 about the periphery thereof. When the scanning disc 62 is rotated in the counterclockwise direction the stepped cut-outs will pass over the aperture area 33. Thus, the indicia projected onto the screen will be viewed in increasingly wider increments with the left side of the line being visible for the entire duration. In FIG. 7, it is seen that the disc 64 is provided with a plurality of substantially rectangular-like cut-outs about the periphery thereof. Thus, when the disc 64 is rotated each of the cut-outs 65 will pass over the aperture 33 such that the entire line is projected for a predetermined time. The film advance in the embodiments of FIGS. 6 and 7 will be timed in a manner similar to that hereinabove described.

Thus it will be seen that the specific embodiment of the invention herein described comprises:

In a projection system of the type in which a film 27 is held stationary or moved step by step 26 across a projecting system which includes an optical system comprising a light source 22 and a lens 24, the film being disposed between the source and the lens, a novel multi-condition field-defining device comprising:

a scanning disc 36 having a first set of light passages 42, 42 so formed and located that when the scanning disc is continuously rotated and the film advanced a field of view is displayed by scanning, said scanning disc being formed with a second plurality of light passages 43, 43 located and formed so that when the scanning disc is stationary and the second set are exposed a steady field of view is projected as the film is held stationary, a motor 35 for driving the scanning disc, a mask 37 adapted to be angularly positioned either to expose or to mask (FIG. 11) the second set of passages, means 46 for normally biasing the mask so that said second formations are masked, when the scanning disc rotates, a multi-position switch 48 adapted to order "scan," and "line" and "hold" conditions of operation, control means 58 for turning the motor on and off, arresting means 61 for holding the scanning disc, and bias-overcoming means 45 for moving the mask relative to the scanning disc 36 so as to expose said second set of passages 43, 43, said switch including means for actuating the control means so that the motor is on for the scan condition and off for the others, said switch further including means 52 for actuating the arresting means 61 so that the scanning disc 36 rotates for the scan condition and is held stationary for the others, the last-mentioned means moving the mask at 45 so that the mask causes the second set of passages to be closed for the scanning operation and open for the line operation.

While present exemplary embodiments of this invention have been illustrated and described, it will be recognized that this invention may be otherwise variously embodied and practiced by those skilled in the art.

What is claimed is:

1. In a projection system of the type in which a film is held stationary or moved step by step across a projecting system which includes an optical system comprising a light source and a lens, the film being disposed between the source and the lens, a novel multi-condition field-defining device comprising:

a scanning disc having a first set of light passages so formed and located that when the scanning disc is continuously rotated and the film advanced a field of view is displayed by scanning, said scanning disc being formed with a second plurality of light passages located and formed that when the scanning disc is stationary and the second set are exposed a steady field of view is projected as the film is held stationary, a motor for driving the scanning device, a mask adapted to be angularly positioned either to expose or to mask the second set of passages, means for normally biasing the mask so that said second formations are masked when the scanning disc rotates, a multi-position switch adapted to order "scan," and "line" and "hold" conditions of operation, control means for turning the motor on and off, arresting means for holding the scanning disc, and bias-overcoming means for moving the mask relative to the scanning disc so as to expose said second set of passages, said switch including means for actuating the control means so that the motor is on for the scan condition and off for the others, said switch further including means for actuating the arresting means so that the scanning disc rotates for the scan condition and is stationary for the others, the last-mentioned means moving the mask so that the mask causes the second set of passages to be closed for the scanning operation and open for the line operation.

2. In a controlled projection reader of the type comprising a light source, a lens, film-positioning means for positioning the film between said source and said lens, an aperture located between said film and said light source, a multi-purpose field defining device comprising:

a scanning disc rotatably mounted and positioned so that a margin thereof traverses, in superimposed fashion, the aperture, said disc being formed with two sets of light passages for permitting projection of the film image therethrough to the lens system, one of said sets defining one type of field as the disc is rotated and the film advanced and the other of said sets defining another type of field as the disc and the film are stationary, a mask for closing one of said sets of passages, means for opening the mask when the disc is rotating so that said one type of field is defined by scanning, and means for closing the mask when the disc and field are stationary so that the other field is defined by line projection.

3. In a reader the combination as set forth in claim 2 in which each of the first passages of said scanning disc is spiral in shape, the second passages being windows communicating with said first passages, and in which said mask is a disc having ears which are normally superimposed over said windows.

4. In a reader the combination as set forth in claim 3 in which said scanning disc is formed with limiting slots therein, said masking ring being formed with projecting flaps which protrude through said limiting apertures, the cooperative engagement of said flaps and said limiting slots arresting the ears so that the windows are exposed.

5. In a reader the combination as set forth in claim 4 and a cam member, said scanning disc being fixedly mounted on said cam member and said masking disc being rotatably secured to said scanning disc, and a motor for driving the cam member.

6. In a reader, the combination as set forth in claim 5 in which said cam comprises a camming surface terminating in a slot, and mask-control means including a lever pivotally supported, one end of said lever having a projecting lug in close proximity with said camming surface when the cam is rotated for scan operation, said lug being held out of engagement with said camming surface wherein said window passages of said scanning device are covered by said masking ring ears.

7. In a reader, the combination as set forth in claim 6, the mask-control further including biasing means for urging the lug into engagement with said camming surface when the cam is ordered to stop so that continued rotational movement of said cam by said motor will cause said lug to enter said slot to finally rest in said slot, said lug simultaneously engaging one of said flaps to prevent further rotation thereof, final rotation movement of said scanning disc causing said windows to be opened.

* * * * *